FUEL INJECTION PUMPING APPARATUS

This is a continuation of application Ser. No. 396,553 filed Sept. 12, 1973, now abandoned.

FIELD OF THE INVENTION

This invention relates to liquid fuel injection pumping apparatus of the kind described in the Specification of U.S. Application Ser. No. 286,337.

SUMMARY OF THE INVENTION

In the specification of my application numbered as above, there is described a liquid fuel injection pumping apparatus for supplying fuel to an internal combustion engine, the apparatus comprising a body part, a rotary distributor mounted in the body part, an outlet passage in the body part adapted for connection to an injection nozzle of an associated engine and a fuel delivery passage in the distributor member, said delivery passage communicating with the pumping chamber of an injection pump and being arranged to register with said outlet passage during delivery of fuel by said injection pump, the apparatus also incorporating a delivery valve disposed in one of said passages, said delivery valve including a spring-loaded valve element which is opened by the flow of fuel from the injection pump, and a valve controlled vent passage in the body part and a vent conduit in the distributor, said vent conduit communicating with the aforesaid fuel delivery passage and being arranged to communicate with said vent passage during the time when fuel is delivered by the injection pump, the arrangement being such that the valve in the vent passage can be opened to allow air to escape through said vent conduit.

In the apparatus described in the specification, the valve controlled vent passage in the body part, comprises a suitably positioned vent passage which extends from the exterior of the body part and which opens onto the periphery of the distributor. The conduit is provided with a screw-threaded portion at its end adjacent the exterior of the body part, the screw-threaded portion receiving a complementarily screw-threaded plug constituting a valve. Moreover, the plug is provided with an elongated extension which substantially fills the passage so that the volume of fuel within the passage is reduced as much as possible.

It has been found to be expensive to machine the passage and also the plug with its extension to the required degree of accuracy so as to ensure that the volume of fuel in the passage remains as small as possible and the object of the present invention is to provide a fuel pumping apparatus of the kind specified in an improved form.

PRIMARY OBJECTS OF THE INVENTION

According to the invention in an apparatus of the kind specified the valve controlled vent passage comprises a passage having at its end adjacent the exterior of the body part a screw-threaded portion to receive a complementarily screw-threaded plug which can be loosened or removed from the passage to permit bleeding of air, the passage also defining at its end adjacent the distributor, a seating, a valve element for co-operation with said seating and resilient means biasing the valve element into contact with the seating.

BRIEF DESCRIPTION OF THE DRAWING

One example of a liquid fuel injection pumping apparatus in accordance with the invention will now be described with reference to the accompanying drawings in which.

DESCRIPTION OF A PREFERRED EMBODIMENT

Figure 1:
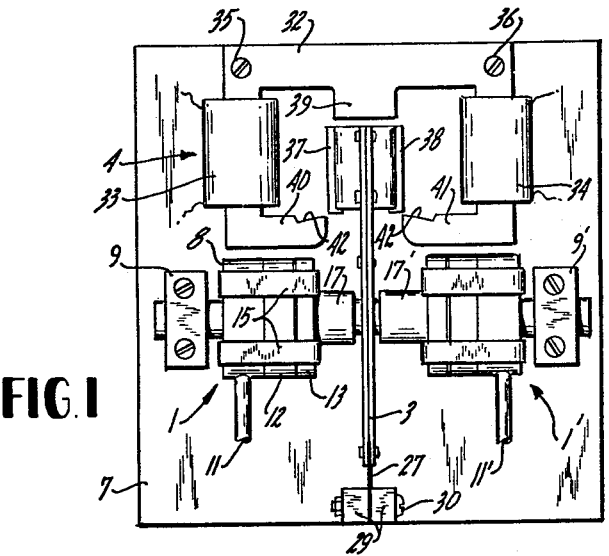
FIG. 1 is a sectional side elevation through the pump.

Referring to FIG. 1 of the drawings there is provided a body part 10 in which is mounted a rotary cylindrical distributor member 11. The distributor member is adapted to be driven in timed relationship with an engine with which it is associated and at one end of the distributor member there is provided the rotary part of a fuel injection pump including plungers 12. The plungers are located in a bore formed in part of the distributor member and which communicates with a fuel delivery passage 13 formed in the distributor member. The plungers are arranged to be moved inwardly as the distributor member rotates, by the action of cam lobes formed on an annular cam ring 14 which surrounds the distributor member and which is mounted in the body part.

The delivery passage 13 includes a portion which extends to the periphery of the distributor member and this is arranged to register in turn as the distributor member rotates, with a plurality of outlet passages 15 formed in the body part. The outlet passages 15 are connected respectively to the injection nozzles 16 of an associated engine, only one of which is shown. Moreover, located within the delivery passage is a delivery valve which is schematically shown at 17. The valve includes a spring-loaded valve element which is opened by the flow of fuel which occurs along the delivery passage as the plungers 12 are moving inwardly.

Also communicating with the delivery passage 13 are a plurality of inlet passages 18 which in known manner, are arranged to communicate in turn with an inlet port 19 formed in the body part and communicating with a source of fuel at a low pressure. The arrangement is such that when an inlet passage is brought into register with the inlet port 19, fuel can flow from the low pressure source to the injection pump to effect outward movement of the plungers 12. When the plungers are moved inwardly, the passage 18 is out of register with the port 19 so that the fuel displaced by the injection pump flows past the delivery valve to an injection nozzle.

When the apparatus is first manufactured or when in use the fuel supply fails, all the passages will contain air and the strength of the spring which loads the valve element of the delivery valve 17 is such that owing to the presence of the air, the injection pump is unable to build up sufficient pressure to effect opening of the delivery valve and no fuel will be delivered by the apparatus.

In order to overcome this problem there is formed in the body part of the apparatus a vent passage 20 which at one end opens out onto the periphery of the distributor member 11. At its other end the vent passage is closed by a screw plug 21 which constitutes the equivalent of a valve. Moreover, formed in the distributor member is a vent conduit 22 which at one end communicates with the delivery passage 13 and which at its U.S. Patent  February 3, 1976  Sheet 1 of 2  3,936,245

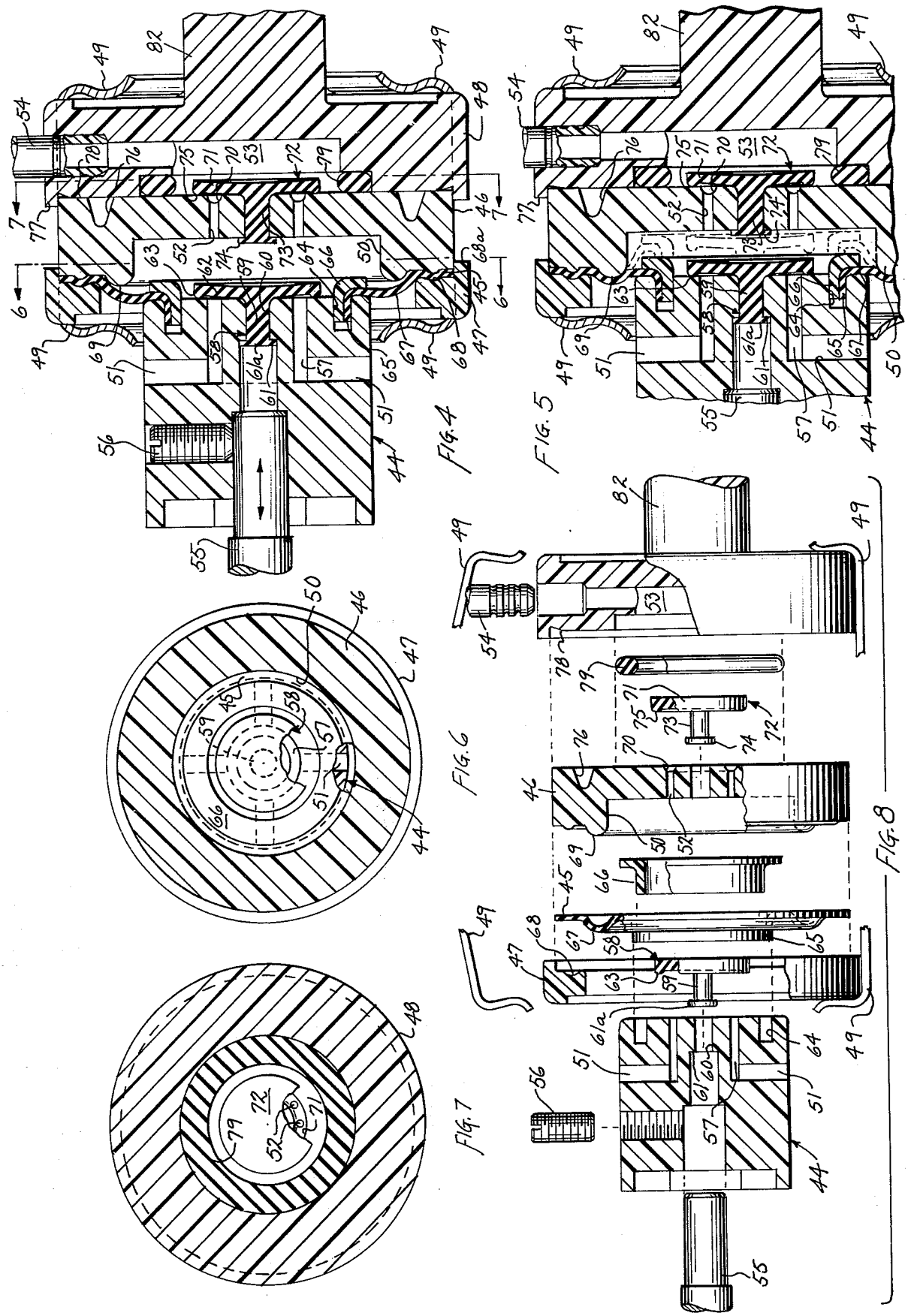

FLUID COMPRESSING APPARATUS

BACKGROUND OF THE INVENTION

This application is a continuation in part of Applicant's application entitled Electromagnetically Driven Fluid Compressor Apparatus, which was filed on Apr. 3, 1972 with Ser. No. 240,718, now U.S. Pat. No. 3,784,334, and further includes subject matter originally claimed and cancelled from the above entitled application.

This invention relates to a fluid compressing apparatus and particularly such an apparatus which is especially adapted to form a small pneumatic compressor unit for incorporation in commercial and institutional air conditioning and process control systems.

Conditioning and process control systems may be of an all pneumatic, all electric or a combination pneumatic and electric variety; depending upon the particular design requirements. Purely electrical systems have certain distinct advantages from the design of suitable sensors for detecting variables such as temperature, pressure, humidity and the like. Further, electrical signals can be conveniently transmitted to operating and actuating control devices. However, pneumatic systems have been widely employed because of the high power characteristic of pneumatic operators at relatively low cost and because the overall control systems are generally somewhat simpler, more reliable and less costly than a comparable electrical design. This is particularly true because in electrical systems, it is difficult to modulate accurately the significant electrical power levels required to produce the necessary mechanical output. Thus, the electrical output will normally drive a motor device which, in turn, is converted into a mechanical output through a motor driven gear train or a motor driven hydraulic pump operator.

Although penumatic systems have generally predominated in the commercial control field particularly for institutional and commercial air conditioning systems and the like, all electric systems have more recently found increasing applicability, particularly in relatively smaller systems where the additional expense associated with the electrical operators is only slightly greater than the cost associated with the necessity of a relatively large single air compressor. Thus, the compressors must be capable of producing pressures of the order of 20 pounds per square inch (psi). The same advantage does not apply in larger overall systems where a generally similar compressor cost is relatively a much smaller percentage of the total cost.

As pointed out in Applicant's issued U.S. Pat. No. 3,411,704, very substantial need exists for a small, compact and efficient electromagnetic fluid compressing apparatus which can be constructed at a minimum cost such as to permit application in relatively small environmental conditioning and process control systems. The above patent discloses a small, electromagnetically driven compressor. Thus in the environmental control field, new installation often employs a plurality of individual roof top units in which local pneumatic supplies are required, which can advantageously be such a compressor.

Although such devices operate satisfactorily, the efficiency and construction requirements are not particularly adapted to low cost, mass production processes such as often required for commercial manufacture and sale of products.

SUMMARY OF THE PRESENT INVENTION

The present invention is particularly directed to a highly efficient compressing apparatus which can drive pneumatic operators and particularly for environmental and process control systems in response to an electrical drive.

Generally in accordance with the present invention, the compressor includes a diaphragm member coupled to and forming a part of a movable piston means. The piston means includes an intake valve structure preferably in the form of a resilient disc overlying a suitable axial inlet opening in the face of the piston which automatically opens during the return stroke of the piston and closes during the compression stroke. A similarly constructed exhaust valve is mounted in the wall opposite the piston and thus is opened during compression stroke at a selected position and is automaticly closed during the return stroke as the pressure drops to a selected level. The location of the intake valve within the piston employes the inertial effect of the piston movement to open the intake valve at the start of the suction stroke. Further in accordance with a particular novel aspect of the present invention, the diaphragm is formed with a convolution and the opposed compression chamber wall is formed with an aligned and preferably corresponding projection which permits a longer operating stroke and results in a higher volumetric efficiency. The construction of the intake and exhaust valve members is essentially the same and significantly contributes to the practical construction of a low cost unit.

More particularly, in accordance with a further novel feature and construction of the present invention, an annular diaphragm member has a central opening with the periphery secured within an annular recess in the face of a piston. The outer peripheral edge of the diaphragm is affixed between a clamp member and a valve plate which has a central recess to form a pumping or compression chamber. The diaphragm has a convolution which opens toward the compression chamber generally aligned with the outer peripheral portion of the compression chamber wall. The latter peripheral portion includes a projection complementing the convolution and mating therewith in the center position of the piston. The piston includes suitable axial annular spaced intake openings suitably located inwardly of the diaphragm and centrally of the piston unit. A Tee-shaped valve member formed of a suitable flexible material includes a stem locked within the piston concentrically of the intake opening and with a planar seal lid or disc abutting the inner face of the piston and with the peripheral edge located outwardly of the intake opening. The stem may pass through a central opening with an outer stem enlargement creating a resilient clamping of the valve member to a holding portion of the piston. The outer peripheral edge of the disc is formed with a slight raised portion facing and abutting the piston to resiliently preload the disc to establish a closed position. The valve plate is formed of a thickness corresponding to the holding portion of the piston unit such that an identical valve member is secured within the exhaust or output plate. A plurality of circumferentially distributed openings are formed in the valve plate inwardly of the periphery of the output valve disc. Thus, the inward movement of the piston and associated diaphragm, compresses the fluid within the compression chamber and at a selected position, the fluid is compressed to establish a sufficient force to overcome the force of the output valve disc. The compressed fluid flows from chamber through the output passageways to a suitable load, preferably through an output chamber formed in an outer mounting plate.

In a particularly practical structure, the several body portions are formed as platelike members including a mounting plate, a valve plate and a clamping ring mounted in a stacked formation, with the outer periphery of a diaphragm located between the valve plate and the clamping ring. Suitable U-shaped spring members or the like snap over the outer peripherial edge to lock the several body portions in superimposed relationship. The inner edge of the diaphragm is secured to the piston which couples to a suitable drive such as a vibrating electromagnetic drive means. The piston and body members are formed of a suitable plastic medium to permit conveninet molding of the parts. The similar valve members and other parts are readily and conveniently assembled with a minimum amount of skill required.

Applicant has found that the present invention thus provides a relatively compact, compressing means having a relatively high degree of efficiency.

BRIEF DESCRIPTION OF THE DRAWINGS

The drawings furnished herewith illustrate preferred constructions of the present invention in which the above advantages and features are clearly disclosed as well as others' that will readily be understood from the following description.

Figure 2:
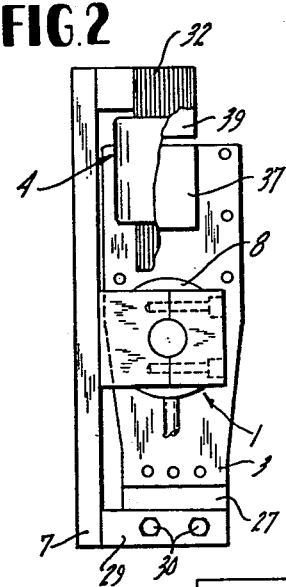
FIG. 2 is a section to an enlarged scale of part of the apparatus of FIG. 1.
Figure 3:
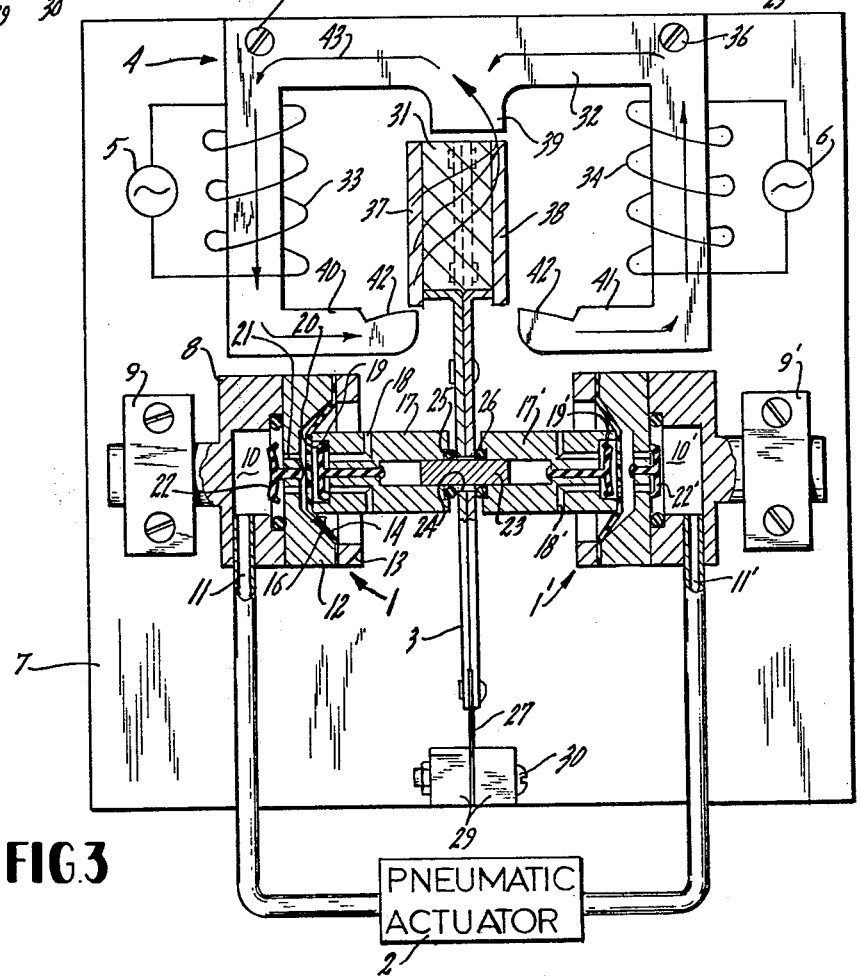

In the drawings:

FIG. 1 is a front elevational view of the electromagnetically driven fluid compressing apparatus constructed in accordance with the present invention;

FIG. 2 is a side elevational view of FIGS. 1 and 2;

FIG. 3 is an enlarged front view with parts broken away and sectioned to show details of the construction;

FIG. 4 is an axial sectional view of an alternate construction of the invention;

FIG. 5 is a fragmentary view of FIG. 4 showing the piston position at an intermediate position in full line and at the end of a compression stroke in phantom;

FIG. 6 is a sectional view taken generaly on line 6—6 of FIG. 4, and illustrating the inlet port arrangement of the compressing apparatus;

FIg. 7 is a view taken generally on line 7—7 of FIG. 4 and illustrating the output part of the exhaust valve construction; and FIG. 8 is an exploded illustration of the components shown in FIGS. 4–7.

DESCRIPTION OF THE ILLUSTRATED EMBODIMENT

Referring to the drawing and particularly to FIG. 1, a fluid compressing apparatus is illustrated including a pair of corresponding air compressors 1 and 1', each of which is constructed in accordance with the present invention. The compressors are interconnected to actuate a suitable pneumatic actuator 2 and are similarly coupled to a driven element 3 forming a coupling element between the compressors and an electromagnetic drive means 4. A pair of synchronized alternating current supplies 5 and 6 are connected to actuate the drive means 4 as more fully developed hereinafter to produce oscillation of the element 3 with a corresponding continuous opposite actuation of the compressors 1 and 1' to maintain a predetermined and related output to the pneumatic actuator 2. A common support 7 is provided upon which the compressors 1 and 1' are mounted immediately below the electromagnetically driven means 4.

In the illustrated embodiment of the invention, the compressors 1 and 1' are correspondingly constructed and consequently the air compressor 1 will be described in detail with the corresponding elements of the compressor 1' identified by corresponding primed numbers.

The air compressor 1 includes a base body portion 8 which is secured to the right lower edge or side of the support 7 by a suitable clamping bracket 9. The bracket 9 is bolted or otherwise secured to the support plate 7 and allows lateral positioning of the compressor 1 with respect to the normal standby position of the driven element 3. The compressor 1' is similarly mounted by a bracket 9' to allow corresponding positioning of the two compressors with respect to element 3.

The base portion 8 is provided with an output chamber 10 centrally formed thereof and with an outlet passageway 11 connected in common with the outlet passageway 11' of compressor 1' to the pneumatic actuator 2. The chamber 10 is closed by an intermediate body member or portion 12. An outer clamping ring 13 clamps a diaphragm 14 against the outer face of the body 12. The three body portions 8, 12 and 13 are clamped together in any suitable means; shown as a simple plurality of U-shaped clamping springs 15 which project over the outer periphery of the body portions.

The central body portion 12 is provided with a recess 16 which is closed by the diaphragm 14 and defines a compression chamber. The diaphragm 14 is a suitable flexible member such as a conventional rubber on fabric diaphragm, with the central portion thereof bonded or otherwise affixed to an adjacent end of a piston 17. The movement of the piston 17 results in the expansion and contraction of the compression chamber. The piston 17 includes a plurality of L-shaped inlet passageways 18 which extend from the periphery inwardly and then axially toward the diaphragm. A cup valve 19 is disposed within a valve chamber 20 from in the face of the piston 17 immediately adjacent the diaphragm 14 and is biased to close the inlet passageway 18. The valve member 19 is formed of a suitable soft rubber such as silastic or "Buna N." Thus the reciprocation of the piston 17 results in the alternate establishment of suction and compression strokes to produce timed spaced output pulses at line 11.

The diaphragm 14, in turn, is provided with openings establishing communication between the compression chamber 16 and the piston chamber 20. Thus when the piston 17 is moved outwardly or to the right, as shown in FIG. 1, the valve member 19 is free to open thereby admitting air into the chamber 20 and the compression chamber 16. When the piston moves during a compression stroke in the opposite direction, however, the reduction of chamber 16 compresses the air within the chamber 16 resulting in a build-up of pressure which is fed back through the chamber 20 to the exterior of the valve 19 and causes it to close. The air within the chamber 16 will, consequently, be compressed during the compression stroke.

A plurality of coaxially arranged outlet passageways 21 are provided in the base of the wall 12 and provide communication between the compression chamber 16 and the outlet chamber 10. An outer valve cap 22 overlies the passageways 21 with chamber 10. During the compression stroke, the air within the chamber 16 will be compressed to a level sufficient to overcome the holding force on the valve member 22, causing it to move outwardly and allowing discharge of the compressed air outwardly through the chamber 10 and passageway 11 to the actuator 2.

The air compressor 1' is similarly located to the opposite side of the element 3 and thus operate in alternate synchronism with the compressor 1, such that its output pulse occurs during the suction stroke of the piston 1. In this manner a continuous output pressure signal is supplied to the pneumatic actuator 2.

The pistons 17 and 17' are coupled to each other and to the driven element 3 in the illustrated embodiment as follows. A pin 23 extends through an opening 24 in the element 3 in coaxial alignment with the pistons 17 and 17'. Suitable recesses or central openings are provided within the ends of the pistons 17 and 17' with the pin 23 secured therein to produce a rigid interconnection between the pistons 17 and 17'. The opposed ends of the pistons 17 and 17' are spaced slightly from the driven element 3 with an O-ring members 25 and 26 located between the piston 17' and the element 3. The O-ring members 25 and 26 are formed of a suitable relatively soft rubber and establish a resilient contact or engagement of the corresponding piston with the driven element 3 to establish a significantly quiet operation as the lever 3 moves to drive the pistons 17 and 17'.

The driven element 3 is formed as a flat lever extending downwardly from the pin 23 to the outer portion of the support plate 7. A leaf spring 27 is riveted or otherwise secured to the end of the adjacent layer 3 and extends outwardly in a corresponding plane therefrom. The spring 27 is located between a pair of clamping blocks 29, one of which is secured to the support plate 7 and the other of which is releasably forced against the opposite face of the spring 27 by a suitably clamping screw 30.

The opposite end of the lever 3 projects outwardly in the opposite direction to the drive means 4. A magnet 31, shown as a permanent magnet, is integrally formed with, or may be separately formed and suitably secured to, the outer end of the lever 3. Magnet 31 extends outwardly from lever 3 with the poles to the opposite side of the plane through the lever 3, as the result of the polarization thereof.

The magnet 31 is a generally rectangular block-type permanent magnet, with the north pole formed to the right side of the magnet and the south pole to the left side thereof, as viewed in FIGS. 1 and 3. The magnet 31 is located within a generally rectangular magnetic frame 32, the one branch of which is formed with an opening through which the lever 3 extends. The opposite side legs or portions of the frame 32 are provided with coils 33 and 34, respectively, which coils are connected to the alternating current power supplies 5 and 6.

The frame 32 is secured to the support 7 by suitable clamping bolts 35 and 36 with the frame encircling the magnet 31 and furthermore with the magnet 31 located generally centrally of the frame 32. The magnet 31 is provided with pole shoes 37 and 38 along the opposite pole edges adjacent the poles of the magnet 31. The upper end of the magnet and the poles 37 and 38 are spaced inwardly from the base portion of the frame 32, which, in turn, is provided with an inwardly projecting extension 39 terminating in slightly spaced relation to the magnet 31. The width of the pole 39 generally corresponds to the width of the magent 31 such that the pole shoes 37 and 38 project outwardly or laterally of the pole 39. The opposite side of the magnetic frame is provided with the opening through which element 3 passes and thus defines a pair of pole arms or ends 40 and 41. The pole arms 40 and 41 are spaced from each other generally in accordance with the total width of the magnet 31 and in particular to locate the ends generally in alignment with the outer face of the pole shoes 37 and 38, as shown in FIG. 1. Furthermore, the ends are curved as at 42 to extend outwardly and laterally away from the corresponding pole shoe. The sources 5 and 6 are operated in synchronism, or a single supply is used, and in a predetermined phase relationship in accordance with the orientation of the coils 33 and 34 to establish oppositely directed fluxes in the magnetic frame 32. The coils 33 and 34, therefore, provide a corresponding directional flux within the frame 32 at the position of the magnet 31.

During one half cycle, the pole 39 will be at a relative north polarity with respect to the arms 40 and 41, with a flux as diagrammatically shown by the flux lines 43. A repelling force is established between the pole 39 and the right edge or north pole of the magnet 31. Simultaneously, there is an attractive magnetic force between the pole 39 and the shoe 37 connected to the sourth pole of the magnet 31. This tends to move the upper or outermost end of the element 31 and lever 3 to the right as viewed in FIG. 1. Simultaneously the end of arm 40 defines a south magnetic pole which interacts with the south magnet shoe 37 with a repulsive force thereby tending to also move the magnet 31 to the right. The shoe 41, which is also a south pole, attracts the north pole shoe 38 of the magnet 31, thereby establishing a further force moving the magnet 31 to the right. As a result, the lever 3 will pivot to the right about the leaf spring 27. When the outputs of the alternating current power supplies 5 and 6 are reversed, the magnetic field 43 reverses thereby generating an effective north pole at the end of arms 40 and 41 and a south pole at the element 39. This will reverse the force interaction with the magnet 31 causing the magnet 31 to move in the opposite direction.

A highly practical alternate construction of the compresing apparatus is illustrated in FIGS. 4-8 which generally employs a multiple body arrangement similar to that shown in the embodiment of FIG. 3.

Referring to FIG. 4, the illustrated pneumatic compressor or pump apparatus generally includes a piston unit 44 having a diaphragm 45 secured to its working face. The outer peripheral edge of the diaphram 45 is clamped between a valve plate 46 and an outer clamping ring 47. A mouting plate 48 is clamped in abutting relationship to the opposite side of valve plate 46. A plurality of generally U-shaped springs 49 are snapped over the periphery of the assmebled plates 46 and 48 and clamping ring 47 as in the previous embodiment. A working or compression chamber 50 is formed between the base of a recess within the valve plate 46 and the opposed face of the piston 44 and diaphragm 45. A plurality of circumferentially distributed valved inlet passageways or openings 51 are formed in the piston 44 for the introducing of air into the chamber 50, where it is compressed and transferred through valve outlet openings 52 in plate 46 to an output chamber 53 provided with a suitable output connecting conduit or tap 54, as in the first embodiment.

More particularly in the preferred construction of FIGS. 4-8, the piston 44 is a cylindrical member having a central opening passing therethrough and with the outer end stepped to accommodate an incoming coupling shaft 55 which is locked thereto as by a suitable set screw 56. Shaft 55 is connected to any driving source such as that previously illustrated. The inlet openings 51 are generally L-shaped and project radially inwardly in axially spaced relation to shaft 54 to an annular common axial opening 57 which is concentric of the shaft axis and terminates in the working face of the piston 44. A generally Tee-shaped valve member 58 is secured within the central opening of piston 44 to selectively open and close the opening 57 and thereby control introduction of air into the chamber 50. In accordance with present invention, the valve member 58 includes a stem 59 projecting into the central piston opening 60 and terminating in spaced relation to shaft 55. The opening for stem 59 is formed with a stepped portion defining a stem opening 60 of a preselected axial length and defining an inner locking ledge 61. The end of the stem is enlarged to form a locking head 61a which abuts the ledge 61. The valve member 58 further includes an integrally formed sealing lid or disc 62 which is located within the chamber 50 in abutting relation to the face of the piston 44. Thus, the disc 62 is a plate like member which extends radially outwardly beyond the location of the axial annular passageway 57. The outer periphery of the disc 62 is further provided with a small beaded surface or projection 63 facing the piston 44 and defining valve seat. The length of the stem 59 between the clamping enlargment 61 and the inner planar face of the disc 52 is selected to be slightly less than the length of the stem opening 60 such that the stem 59 is placed under slight tension with head 61a engaging ledge 61 to firmly clamp the flexible disc 62 abutting the face of the piston 44. The beaded surface 63 is especially formed to be essentially completely free of imperfections such that, with a smooth, planar valve face provided on the piston 44, a fluid tight engagement can be created there between. The bead 63 deflects the outer peripheral edge of the valve disc 62 with respect to the stem 59 and thus provides a resilient preloading or bias urging the valve to the closed position. The valve member 58 can be formed of any suitable material and is advantageously formed of a suitable silicone rubber for application in pneumatic system.

The inner face of the piston 44 is further provided with an annular clamping recess 64 spaced outwardly of the periphery of the valve disc 62 to accomodate a corresponding cylindrical portion or flange 65 of the diaphragm 45. The radial width of the recess 64 is significantly larger than the thickness of the diaphragm flange 65 and a wedging or clamping grommet 66 is forced into the recess to rigidly clamp the corresponding portion of diaphram 45 to piston 44. The grommet 66 has a radial flange also abutting and clamping the adjacent surface of the diaphragm against the face of the piston 44 to provide a firm and reliable interconnection such that movement of the piston 44 is imparted to the corresponding inner periphery of the diaphragm 45.

The diaphragm 45 of the illustrated embodiment of the invention is a preformed member formed of a suitable resilient flexible material such as a Buna "N" rubber on a nylon fabric base. The diaphragm 45 includes an intermediately located convolution 67 and an outer planar clamping portion. The convolution 67 is located between the outer edge of the piston 44 and the inner periphery or edge of the mouting ring 47, and with the convolution opening inwardly of the chamber 50. The outer periphery of the diaphragm 45 is clamped between plate 46 and ring 47 which are formed with a small complementing recess and projection as at 68 to provide a firm fluid tight connection to the diaphragm. The ring 47 may be formed with an outer circling lip 68a to properly locate the clamping ring 47 in over lying relationship to the valve plate 46 and insure a firm clamping of diaphragm 45. The diaphragm 45 and particularly convolution 67 thereof forms a part of the working surface of the chamber 50, the opposite wall of which is formed by a recess in the valve plate 46. The valve plate 46 is provided with a generally cylindrical chamber forming recess with the radially outer wall spaced outwardly of and concentrically of the piston 44 in general alignment with the inner circumferential edge of the convolution 67. The outer face of the valve plate 46 is formed with an outwardly projecting bead 69 essentially aligned with the convolution 67 in the diaphragm 45. In the assembled relation, the diaphragm 45 is thus clamped in position with the convolution 67 in the diaphragm 45 and 69 in mating relationship, with the piston in an intermediate position of FIG. 5.

The portion of the valve plate 46 outwardly of the bead 69 is generally a planar wall to define, with the opposed surface of the ring 47, a clamping means for the diaphragm, as previously described.

The valve plate 46 is a generally planar member having the base portion with the plurality of outlet openings 52 extending axially there through and on a diameter generally in accordance with the diameter of the annular inlet passageway 57. The discharge openings 52 terminate in the exterior face, which forms a part of the output chamber 52, in slight enlarged recesses 70 located beneath the lid or disc 71 of a valve member 72 which is essentially identical to valve member 58 and similarly secured within the valve plate 46. The valve member 72 in particular includes a valve stem 73 which passes through a central opening in the valve plate 46 with a head 74 abutting the adjacent portion of the valve plate 46 within the compression chamber 50. The valve member lid 71 also includes the sealing valve bead 75 abutting the face of valve plate 46. The depth of the valve plate at the stem corresponds to that of the opening 60 of the piston 44 within which stem 59 is located and is thus slightly longer than the unstressed state of the stem 73. It thus holds the beaded valve lid 71 in overlying sealing relationship to the discharge openings 52.

Both of the valve members 58 and 72 are essentially interchangeable and the lid portions 62 and 75 similarly function to selectively open and close the respective passageways for developing a pressure in chamber 53.

The chamber 53 is formed by a recess within the outlet or mounting plate 48, the outer portion abutting the outer face of the valve plate 46 which is provided with a recess 76 in the abutting portion. The plate 48 further includes an encircling lip 77 with a slight undercut portion 78 immediately adjacent to the lip to permit firm clamping interengagment of the plate adjacent to face of plate 46.

The recess forming chamber 53 inlcudes a step portion immediately adjacent plate 46 within which an O-ring seal 79 is compressed to establish a fluid tight joint readily containing the output pressures.

The mouting plate 48 further includes an outward extension 82 which may be employed for mounting of the valve, similar to the illustration of the previous embodiment.

The operation of the embodiment of FIGS. 4–7 essentially corresponds to that of the previous embodiment. Thus, the reciprocation of the piston 44 results in the selective expansion and contraction of the chamber 50, as a result of the movement of piston 44 and attached diaphragm 45. The convolution 57 permits significant increase in the stroke of the piston 44 (FIG. 4) without adversely affecting the diaphragm characteristic and and thereby promotes higher volumetric efficiency while maintaining proper pressure output. As the piston 44 moves to the right, the valve disc 62 is closed as a result of the compressing forces established in the chamber 50. At a selected position and particularly as the pressure in chamber 50 rises, the fluid pressure is sufficient to overcome the resilient force of the diaphragm disc 75 of the outlet valve member 72. The disc 75 deflects outwardly and the compressed fluid then moves through the passages 70 and chamber 52 to output 53. At the end of the stroke, the inlet valve disc 62, shown in phantom in FIG. 5, is closely spaced from or may even slightly engage the head 74 of the valve member 72. Chamber 50 is at a minimim volume and essentially at the output pressure. The location of the intake valve 58 within the reciprocating piston 44 further contributes to the efficiency of the pumping system because, the inertia effects tend to contribute to a rapid opening of the intake valve disc 62 at the start of a return stroke. As the piston 44 reverses direction, the resilient disc 62 as a result of its inertial effect will tend to delay following of the piston and thereby contribute to the opening of the valve and the introduction of fresh charge into the chamber 50. This also rapidly reduces the pressure in chamber 50, with the output pressure of chamber 55 rapidly moving the exhaust valve disc 72 into sealing engagement with the valve plate.

The several rigid elements 44, 46, 47, 48 and 66 of the apparatus can be readily constructed of a suitable plastic such as polyphenylene oxide plastics, with all but the piston unit 44 preferably being fiberglass filled to increase the strength of the unit. The spring member is formed of a suitably steel strap formed to a generally U-shaped member as more clearly illustrated in FIG. 8. Such as structure can be mass produced and as previously noted provide a very small compact and efficient fluid compressing apparatus. For example, the compressor can be constructed as a generally cylindrical member having an outer diameter of less than 1 inch and of the order of ¾ inch, with a total over all length of approximately 1½ inches.

The present invention thus provides a small compact pumping apparatus having a relatively high operating efficiency and which is particularly adapted to use as a local compressor for operating a pneumatic control in a local operating unit.

Various modes of carrying out the invention are contemplated as being within the slope of the following claims. Particularly pointing out and distinctly claiming the subject matter which is regarded as the invention.

I claim:

1. In a fluid pumping apparatus including a piston member having a diaphragm connected thereto and forming a movable wall of a working chamber, said piston member moving into a final pumping position within the working chamber, said diaphragm being formed of a resilient material and having a preformed unstressed annular convolution of a generally U-shaped configuration immediately adjacent to the outer wall of the piston, and inner and outer generally coplanar clamping walls extending from said convolution, said inner clamping wall being secured to the piston member, said working chamber including means axially clamping said outer clamping wall and having a projection aligned with said convolution and having a surface corresponding thereto and mating with and essentially filling said convolution with the piston moved inwardly to an intermediate position within the working chamber prior to and in spaced relation to said final pumping position and with said convolution in the unstressed preformed state, said piston member including inlet valve openings extending generally axally of the piston and terminating in the working chamber, an inlet valve means connected to the piston member and overlying the terminal end of the inlet valve openings, said inlet valve means including a closure member resiliently urged into sealing engagement with the face of the piston member, a valve plate having a plurality of output openings and connected to said diaphragm to form a wall of said working chamber, and an outlet valve means connected to the valve plate and releasably closing said output openings.

2. The fluid pumping apparatus of claim 1 wherein said intake valve closure member is generally Tee-shaped with a stem and an integrally formed closure disc, said stem having an end enlargement adapted to cooperate with the valve disc to define a pair of spaced clamping surfaces, said piston member having a central opening accommodating said stem and being of a slightly shorter length to stretch the stem and resiliently preload the corresponding disc to the closed position.

3. The apparatus of claim 2 wherein said valve disc has an annular beaded surface concentric of the stem and facing the piston with a projecting bead encircling the valve openings.

4. The apparatus of claim 2 wherein said valve plate is a disc-shaped member having a recess in one wall, said diaphragm having a periphery abutting the valve plate and overlying said recess to define said working chamber, an outer clamping ring abutting the diaphragm and holding the periphery of the diaphragm against the valve plate, a mounting plate abutting the valve plate opposite the recess, and a spring means telescoped over the periphery of the abutting plates and hing to firmly interconnect the plates and ring and seal the joints therebetween.

5. In a fluid pumping apparatus including a piston having a diaphragm connected thereto and forming a movable wall of a working chamber, said diaphragm having a preformed annular convolution of a generally U-shaped configuration immediately adjacent to the outer wall of the piston and an outer clamping wall, said working chamber including means axially clamping said clamping wall and having a projection aligned with said convolution and having a surface corresponding thereto and mating with the convolution with the piston removed inwardly to an intermediate position within the working chamber and with said convolution in the preformed state, said piston including inlet valve openings extending generally axially of the piston and terminating in the working chamber, an inlet valve means connected to the piston and overlying the terminal end of the inlet valve openings, said inlet valve means including a closure member resiliently urged into sealing engagement with the face of the piston, a valve plate having a plurality of output openings and connected to said diaphragm to form a wall of said working chamber, an outlet valve means connected to the valve plate and having a closure member releasably closing said output openings, said valve plate has a recess in one wall with an adjacent annular axial projection and an outer flat clamping surface, said diaphragm having a clamping portion abutting said clamping surface and having said convolution aligned with and abutting said projection and having a central flange, a clamping ring abutting said clamping portion, an outlet plate abutting said valve plate opposite said one wall and having an outlet opening, spring clips overlying said plates and ring to firmly clamp them to each other, said piston having an annular recess with said flange located therein, a grommet in said annular recess clamping said flange to said piston, said inlet valve openings including a common annular recess in the face of the piston coupled to a plurality of radial passageways axially spaced from the face, said piston and valve plate having similar central openigs, each of said closure members including a stem located in the corresponding opening and having an integral resilient valve disc abutting the corresponding face of the piston and valve plate in overlying relation to said inlet and outlet openings, said stem having an end enlargement adapted to cooperate with the valve disc to define a pair of spaced clamping surfaces, said piston having an opening accommodating said stem and being of a slightly shorter length to stretch the stem and resiliently preload the corresponding disc to the closed position, said valve disc having an annular beaded surface concentric of the stem and facing the piston with a projecting bead encircling the openings.

* * * * *

UNITED STATES PATENT AND TRADEMARK OFFICE
CERTIFICATE OF CORRECTION

PATENT NO. : 3,936,245
DATED : February 3, 1976
INVENTOR(S) : ADOLPH J. HILGERT

It is certified that error appears in the above-identified patent and that said Letters Patent are hereby corrected as shown below:

| | | | |
|---|---|---|---|
| Column 3, | Line 20, | after "permit" cancel "conveninet" and insert --- convenient ---; |
| Column 5, | Line 36, | after "adjacent" cancel "layer" and insert --- lever ---; |
| Column 6, | Line 60, | before "plates" cancel "assmebled" and insert --- assembled ---; |
| Column 7, | Line 61, | after "has" insert --- as ---; |
| Column 9, | Line 2, | after "53" cancel "inlcudes" and insert --- includes ---; |
| Column 9, | Line 66, | before "of" cancel "slope" and insert --- scope ---; |
| Column 10, CLAIM 1 | Line 22, | after "generally" cancel "axally" and insert --- axially ---; |
| Column 10, CLAIM 4 | Line 52, | before "valve" cancel "the" and insert --- said ---; |
| Column 10, CLAIM 4 | Line 55, | before "to" cancel "hing" and insert --- ring ---; |
| Column 10, CLAIM 5 | Line 67, | after "piston" cancel "removed" and insert --- moved ---; |
| Column 12, CLAIM 5 | Line 7, | after "central" cancel "openigs" and insert --- openings ---; |

Signed and Sealed this first Day of June 1976

[SEAL]

Attest:

RUTH C. MASON
Attesting Officer

C. MARSHALL DANN
Commissioner of Patents and Trademarks